Jan. 10, 1961   R. E. WILSON ET AL   2,967,910
PULSE TRANSMITTER
Filed May 25, 1955   4 Sheets-Sheet 1

INVENTORS
ROBERT E. WILSON
LAWRENCE E. MERTENS
& RICHARD H. BERGMAN
BY Charles H. Brown
ATTORNEY

INVENTORS
ROBERT E. WILSON
LAWRENCE E. MERTENS
& RICHARD H. BERGMAN

BY Charles H. Brown
ATTORNEY

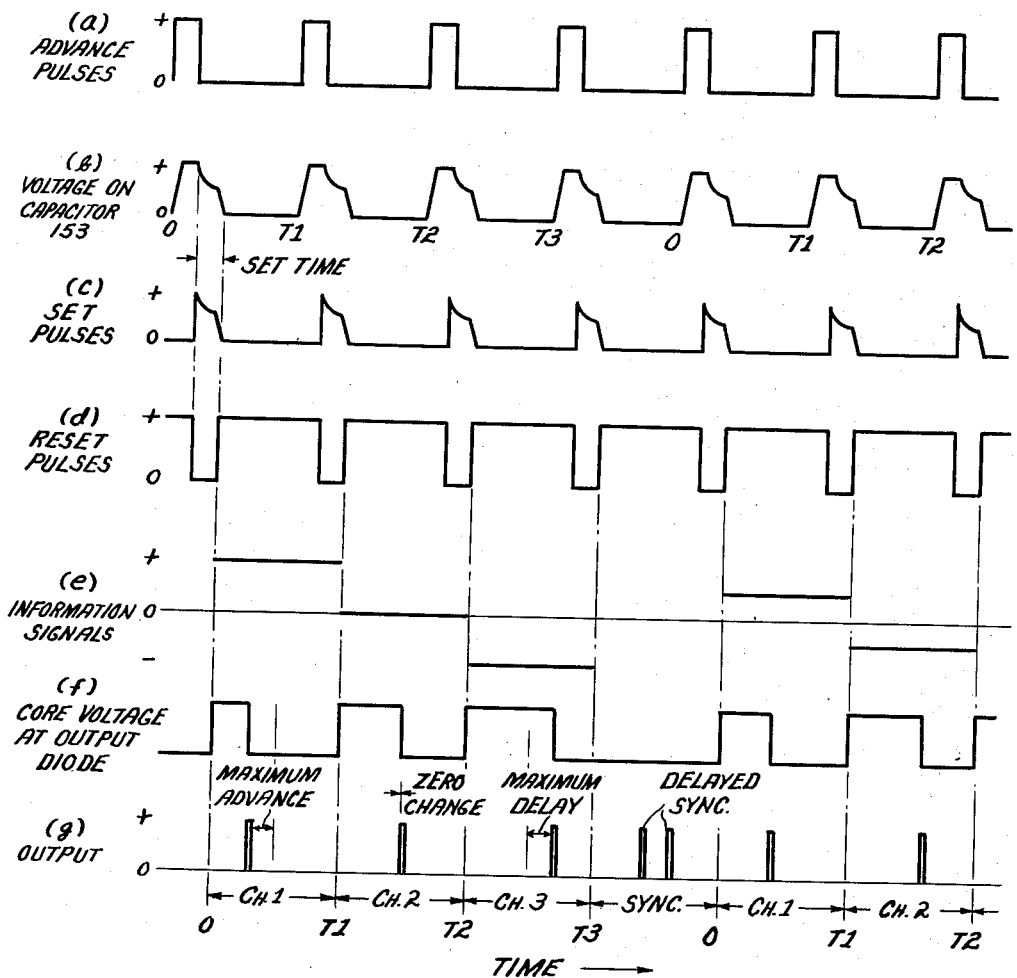

United States Patent Office 2,967,910
Patented Jan. 10, 1961

2,967,910

PULSE TRANSMITTER

Robert E. Wilson, Moorestown, Lawrence E. Mertens, Collingswood, and Richard H. Bergman, Plainfield, N.J., assignors to Radio Corporation of America, a corporation of Delaware Filed May 25, 1955, Ser. No. 510,972

4 Claims. (Cl. 179—15)

The invention relates to a pulse-time modulation multiplex transmitter, and particularly to such a transmitter utilizing saturable magnetic cores. The term "pulse-time modulation" is synonymous with and often referred to as "pulse position modulation" or PPM.

An object of the invention is to provide a novel transmitter for generating a plurality of pulses that are time or pulse position modulated in accordance with information from a plurality of separate sources.

Another object of the invention is to provide a novel pulse-time modulation transmitter for use in a pulse multiplex communication system.

In accordance with the invention, a time modulation transmitter is provided employing a plurality of saturable magnetic cores. Separate input circuits are coupled to the different magnetic cores for applying to each core a separate or individual source of information. A magnetic shift register coupled to the cores individually and sequentially enables an output signal to be produced by each core when that core is driven. Means are coupled to the cores for producing a drive signal having a predetermined duration and repetition rate. During the time interval in which the drive signal is applied, each core, after being enabled, produces an output signal at a time during that interval determined by the magnitude of the information applied to the input circuits. The position or time of occurrence of each channel pulse is directly related to the amplitude of the input signal of that channel. An output circuit is coupled to the transmitter for multiplexing the output signals produced by the cores.

A more detailed description of the invention follows, in conjunction with an accompanying drawing, in which:

Figure 6 shows wave forms used in explanation of the system shown in Figure 5.

Figure 1:
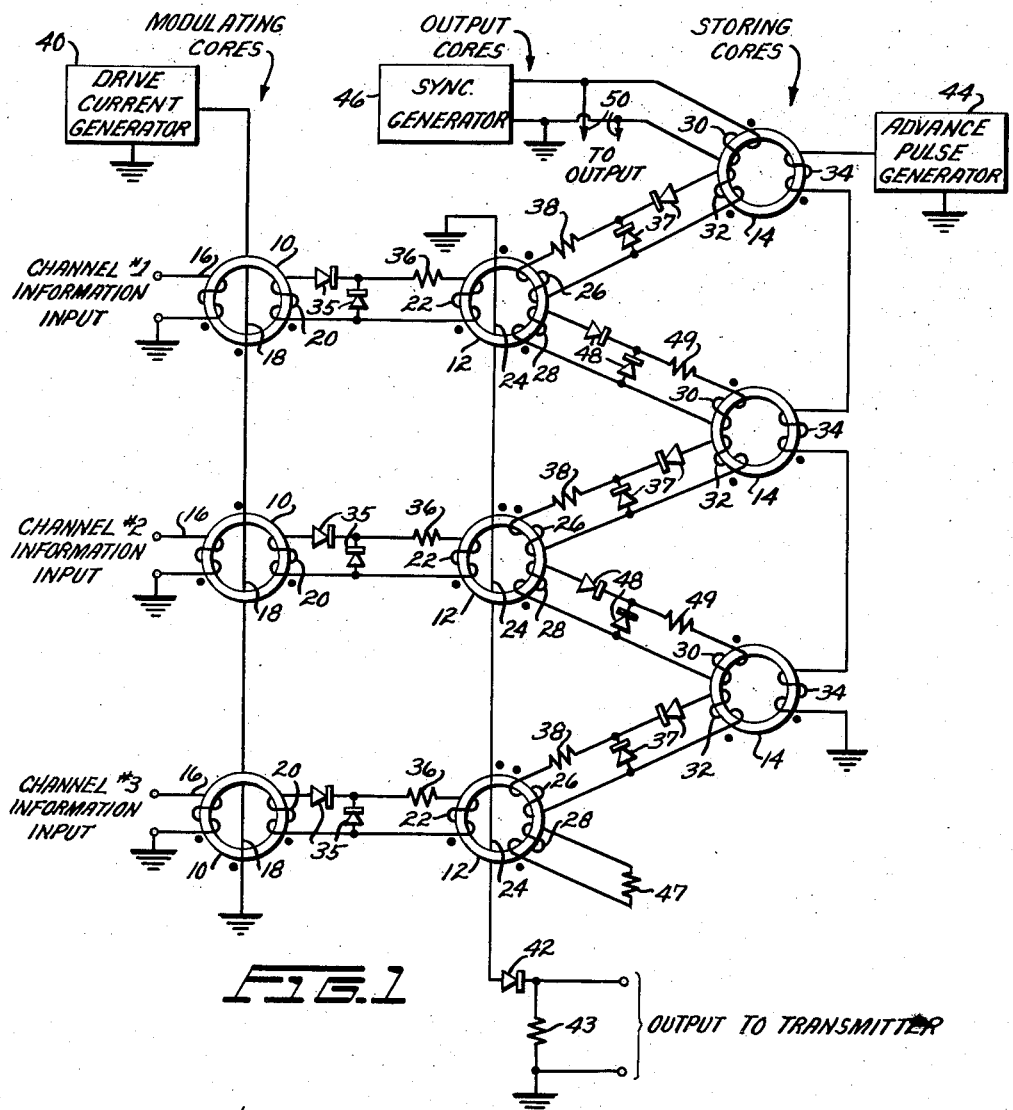
Figure 1 shows a pulse-time modulation multiplex transmitter in accordance with the invention.
Figure 2:
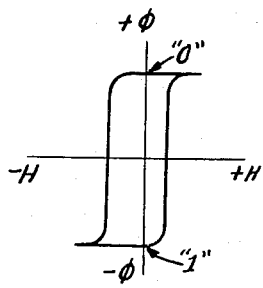
Figure 2 shows a wave form of the hysteresis characteristic of the saturable magnetic cores utilized in the invention.

Referring to Figure 1, a transmitter capable of multiplexing a plurality of information channels is shown. While the transmitter is capable of multiplexing a larger number of information channels, only three such channels are shown in the interest of simplification. Additional channels can be added by following the principles herein set forth. Associated with each channel is a saturable magnetic modulating core 10, a saturable magnetic output core 12, and a saturable magnetic storing core 14. These cores may be made of a magnetic alloy having high permeability and a hysteresis characteristic similar to that shown in Figure 2. Each of these magnetic cores has a substantially rectangular hysteresis characteristic such as shown in Figure 2, which shows the preferred hysteresis characteristic for the saturable magnetic cores used in Figure 1 and subsequent figures. It is desirable that this hysteresis characteristic be as rectangular as possible so that once the magnetic core is saturated by a field intensity H in one direction, no addition magnetic flux $\phi$ will be produced by increasing the field intensity H in the same direction. For convenience, the condition of saturation of the magnetic core in one direction will arbitrarily be referred to as the "0" state, and the condition of saturation in the opposite direction will be referred to as the "1" state. Coupled to each of the modulating cores 10 are an information input winding 16, a drive winding 18, and a coupling winding 20. The relative directions of coupling or polarities of the windings shown in all the figures are indicated by dots next to the winding leads, in accordance with the usual transformer convention. Stated in another way, if a positive pulse is applied to that terminal of one winding having a dot, then positive pulses will appear at those terminals of the other windings on the same core designated by dots.

The output cores 12 and the storing cores 14 are arranged essentially as a two-line magnetic shift register and are utilized as a channel selection counter. Coupled to each of the output cores 12, are a coupling winding 22, an output winding 24, an input advance winding 26, and an output advance winding 28. Coupled to each of the storing cores 14 are an input advance winding 30, an output advance winding 32, and an advance pulse winding 34.

The coupling winding 20 of each of the modulating cores 10 is connected to the coupling winding 22 of each of the output cores 12 by a pair of diodes 35 and a resistor 36. The diodes 35 are poled so that the coupling windings 20 of the modulating cores 10 are effectively connected to the coupling windings 22 of the output cores 12 only when the modulating cores 10 change from the "1" to the "0" state. In a similar manner the output advance winding 32 of each of the storing cores 14 is connected to the input advance winding 26 of each of the output cores 12 by a pair of diodes 37 and a resistor 38. The diodes 37 are poled so that the output advance windings 32 of the storing cores 14 are effectively connected to the respective input advance windings 26 of the output core 12 only when the storing cores 14 change from the "1" to the "0" state. Also, in a similar manner the output advance winding 28 of each of the output cores 12 is connected to the respective input advance winding 30 of each of the storing cores 14 by a pair of diodes 48 and a resistor 49. The diodes 48 are poled so that the output advance windings 28 of the output cores 12 are effectively connected to the input advance windings 30 of the storing cores 14 only when the output cores 12 change from the "1" to the "0" state.

A separate information input circuit is connected to each of the information input windings 16. The information applied to the information input circuits may be any type of intelligence that can be represented by a voltage wave.

The drive windings 18 are serially connected with each other and connected to a drive current generator 40. The drive current generator 40 must be capable of producing a current which greatly exceeds the saturation current of the modulating cores 10. The wave form produced by the drive current generator 40 may be a conventional sawtooth wave, sine wave, or other suitable waveshape which has a predetermined frequency. The output windings 24 coupled to the output cores 12 are serially connected with each other and connected to an output circuit having a diode 42 and a resistor 43.

This output circuit may extend to and control a radio transmitter, not shown, for producing radio waves in response to the pulses appearing across resistor 43. This radio transmitter may be keyed by the output pulses. The diode 42 is poled so that only positive pulses of current appear at the output circuit. The advance pulse windings 34 coupled to the different storing cores 14 are connected in series with each other and connected to an advance pulse generator 44. The advance pulse generator 44 may be any generator capable of producing rectangular advance pulses having the desired duration and a frequency that is substantially the same as the frequency of the drive current generator 40.

As shown in Figure 1, a synchronizing signal (hereinafter called sync) generator 46 is connected to the input advance winding 30 that is coupled to the first storing core 14 associated with channel 1. The sync generator 46 is preferably a generator that is capable of producing a pair of rectangular sync pulses having an accurate and predetermined period of separation and frequency, both of which depend upon the number of channels to be multiplexed and the frequency of the drive current and advance pulses. Such generators are known in the art. Also as shown in Figure 1, a resistor 47 terminates the output advance winding 28 coupled to the last output core 12 associated with channel 3. Or this output advance winding 28 of the last output core 12 may be eliminated altogether.

While not shown, it is possible to connect the output advance winding 28 coupled to the last output core 12 to the input advance winding 30 coupled to the first storing core 14 in order to initiate another cycle of operations, in which case the sync generator 46 would be eliminated. However, such an arrangement does not give the reliable and stable operation that may be obtained by using the arrangement shown in Figure 1 utilizing the sync generator 46, unless further circuits are added to assure that one and only one "1" state is circulated in the register.

Figure 3:
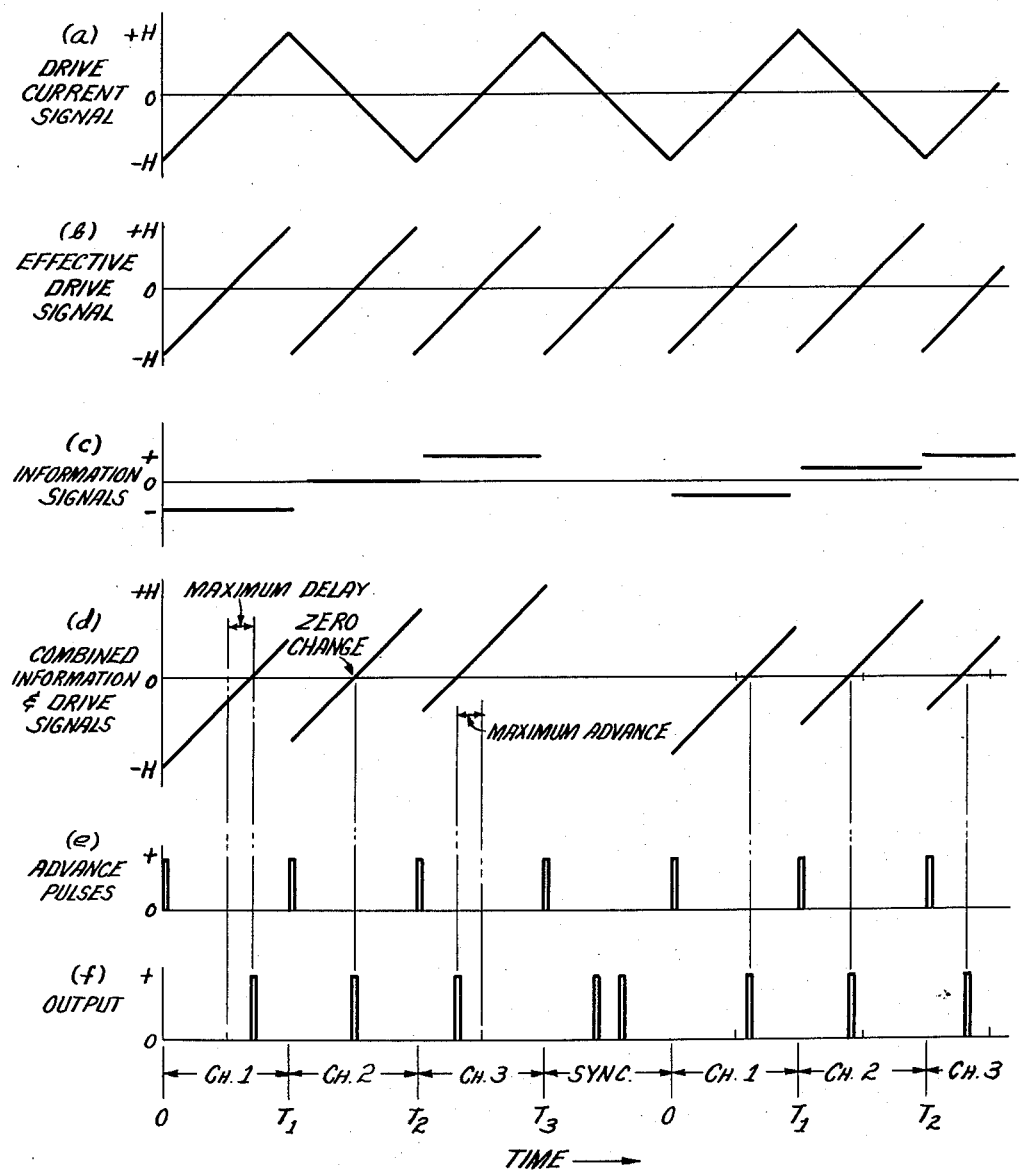
Figure 3 shows wave forms used in explanation of the operation of the system shown in Figure 1.

Wave forms illustrating the operation of the transmitter shown in Figure 1 are shown in Figure 3. In explaining the operation of the transmitter, it will be assumed that all of the storing cores 14 and all of the output cores 12 are in the "0" state. The modulating cores 10, however, are not all in the "0" state. It is assumed at this time that the odd channel modulating cores 10 are in the "1" state at time zero of Figure 3 because of the direction of the drive current signal in the preceding period. It will also be assumed that the sync generator 46 has just previously applied the sync pulses to the input advance winding 30 coupled to the first storing core 14. The sync pulses, shown in Figure 3(f), are poled so that they set up the "1" state in the first storing core 14. At time 0, in Figure 3, the drive current generator 40 begins generating the triangularly shaped drive signal shown in Figure 3(a), and the advance pulse generator 44 produces an advance pulse shown in Figure 3(e). The drive windings 18 coupled to the modulating cores 10 associated with the odd channels are wound so that as the drive signal varies from minus to plus, the modulating cores 10 associated with the odd channels tend to become saturated in the "0" state. The drive windings 18 coupled to the modulating cores 10 associated with the even channels are wound so that as the drive signal varies from minus to plus, the modulating cores 10 associated with the even channels tend to become saturated in the "1" state. When the drive signal varies from plus to minus, the modulating cores 10 associated with the odd channels tend to become saturated in the "1" state, and the modulating cores 10 associated with the even channels tend to become saturated in the "0" state. Thus, as the drive signal is applied, the modulating cores 10 are saturated alternately in the "0" state and the "1" state. The precise time that the modulating cores 10 become saturated in the "0" state or the "1" state is determined by the magnitude and polarity of the information applied to the information input winding 16 coupled to the modulating cores 10. However, the transmitter is arranged so that an output signal is individually and sequentially utilized from the modulating cores 10 only as they are being saturated in one direction, in this case the "0" state. If the information signals have a polarity which aids the drive signal, the modulating cores 10 become saturated sooner than if no information signal were present. If the information signals have a polarity which opposes the drive signal, the modulating cores 10 become saturated later than if no information signal were present. If the magnitude of the information signal is great, the aid or opposition to the drive signal will be correspondingly great. If the magnitude of the information signal is small, the aid or opposition to the drive signal will be correspondingly small. Since the magnitude of the aid or opposition determines the precise time that the modulating cores 10 become saturated, it is possible to produce pulses that are time or position-modulated in accordance with the magnitude and polarity of the information signal.

The applied drive signal, as it effectively appears to each of the modulating cores 10 during its respective output period, is shown in Figure 3(b). The applied drive signal has this appearance because the drive windings 18 are wound oppositely on alternate modulating cores 10 to compensate for the alternate directions of the drive signal produced by the drive current generator 40. The information signals are shown in Figure 3(c). These signals may be represented by a straight line because their rate of change is much slower than the rate of change of the drive signal. It is assumed that the highest audio intelligence modulating frequency applied to the different channels is lower than the frequency of the drive current signal. By way of example, if it is assumed that the highest audio modulating frequency is 4000 cycles per second, then for the four channels (three channels of information and one channel for a sync pulse) shown in the drawing, a drive current frequency of 16,000 cycles per second is needed. The combined information and drive signals, as they appear to the modulating cores 10 during their respective output periods, are shown in Figure 3(d). It will be seen from Figure 3(d) that the magnitude and polarity of the information signals may delay or advance the transition of the modulating cores 10 from the "1" state to the "0" state (which theoretically is the point where the drive signal crosses the abscissa). Since the drive signal current greatly exceeds the saturation current of the modulating cores 10, their transition occurs near the theoretical point where the drive signal crosses the abscissa.

Also at time 0, an advance pulse, produced by the advance pulse generator 44, is applied to the advance pulse windings 34 coupled to the storing cores 14. The polarity of the advance pulses and the advance pulse windings 34 are so related that they always tend to set up the "0" state in the storing cores 14. No change occurs in the storing cores 14 which were previously in the "0" state. Since the "1" state was set up in the first storing core 14 by the sync generator 46, however, the first storing core 14 makes a transition from the "1" state to the "0" state and so produces a pulse at its output advance winding 32. This pulse is passed by the diodes 37 and the resistor 38 to the input advance winding 26 coupled to the first output core 12, and sets up the "1" state in the first output core 12. The first output core 12 was previously in the "0" state, and when it became saturated in the "1" state, it produced pulses in the coupling winding 22, the output advance winding 28, and the output winding 24. These pulses do not affect the other cores because the diodes 35, 42, 48 are so poled that they present a short circuit to the pulses produced when the output core 12 changes from the "0" state to the "1" state. At some time between time 0 and the time $T_1$, depending on the magnitude and polarity of the information applied to the modulating core 10 associated with channel 1, the modulating core 10 associated with channel 1 makes a transition from the "1" state to the "0" state due to the application of the drive current signal from the generator 40. The odd channel 1 has its modulating core 10 in the "1" state because in the preceding cycle or period of operations, the drive current signal varied from plus to minus. This transition produces a pulse in the coupling winding 20 coupled to this modulating core 10 associated with channel 1. This pulse, in turn, is passed by the diodes 35 and the resistor 36 to the coupling winding 22. This pulse also sets up the "0" state in the first output core 12, and since the "1" state was previously set up in the first output core 12 at time 0, an output pulse will appear on the output winding 24 coupled to the first output core 12. This output pulse is passed by the diode 42 to the output circuit, where it is utilized. Also at the time this output pulse is produced, a pulse is applied to the output advance winding 28 coupled to the first output core 12. This pulse is passed by the diodes 48 and the resistor 49 to the input advance winding 30 coupled to the second storing core 14. This pulse sets up the "1" state in the second storing core 14, which is associated with channel 2.

At time $T_1$, the advance pulse applied to the advance pulse winding 34 coupled to the second storing core 14 sets up the "0" state in the second storing core 14. This transition sets up a pulse in the output advance winding 32 coupled to the second storing core 14, and this pulse is passed by the diodes 37 and the resistor 38 to the input advance winding 26 coupled to the second output core 12. Thus, the "1" state is set up in the second output core 12. Between the time $T_1$ and time $T_2$, the second modulating core 10 produces a pulse at a time determined by the information and the drive current signal applied to the second modulating core 10. It should be noted that previously between time 0 and time $T_1$ the second modulating core 10 was set up in the "1" state by the drive current signal going from minus to plus. The pulse from the second modulating core 10 is applied to the second output core 12 causing it to transit to the "0" state. An output pulse appears on the output winding 24, and the "1" state is set up in the third storing core 14.

It will be noted from the dots indicating the winding polarities that pulses appearing on the input advance windings 26 coupled to the output cores 12, and that pulses appearing on the input advance windings 30 coupled to the storing cores 14, do not affect the condition of any of the cores other than those with which they are associated, because the various diodes are poled so that they effectively short circuit or disconnect the windings to the other cores.

The same operation is repeated in regard to channel 3, and when an output pulse is produced by the last output core 12, the cycle ends at time $T_3$. The cycle is repeated by the sync generator 46 producing the sync pulses which set up the "1" state in the first storing core 14 again. If desired, the sync pulses may also be applied to the output circuit for utilization over leads 50 by remotely located receiving equipment to synchronize such receiving equipment with the multiplexing transmitter. The period occupied by the sync pulses may have the same duration as the individual channel periods. To enable a cyclic drive signal to be used without necessitating a rapid flyback, an odd number of channels should be used so that with the addition of the sync period, the total number of periods will be even, and the slope of the drive voltage will have the same sign each time a given channel is sampled.

The operation of the system shown in Figure 1 may be briefly summarized as follows: The "1" state is sequentially transferred down through the output cores 12 one by one. Pulses that are position or time-modulated by the incoming channel information are coupled to the output cores, causing the "1" state to be reset to the "0" state. In this way the "1" state is passed down through the cores to permit sampling each channel individually in turn, thus providing a pulse for each channel at the output circuit during the respective period or time alloted or assigned to that particular channel.

Figure 4:
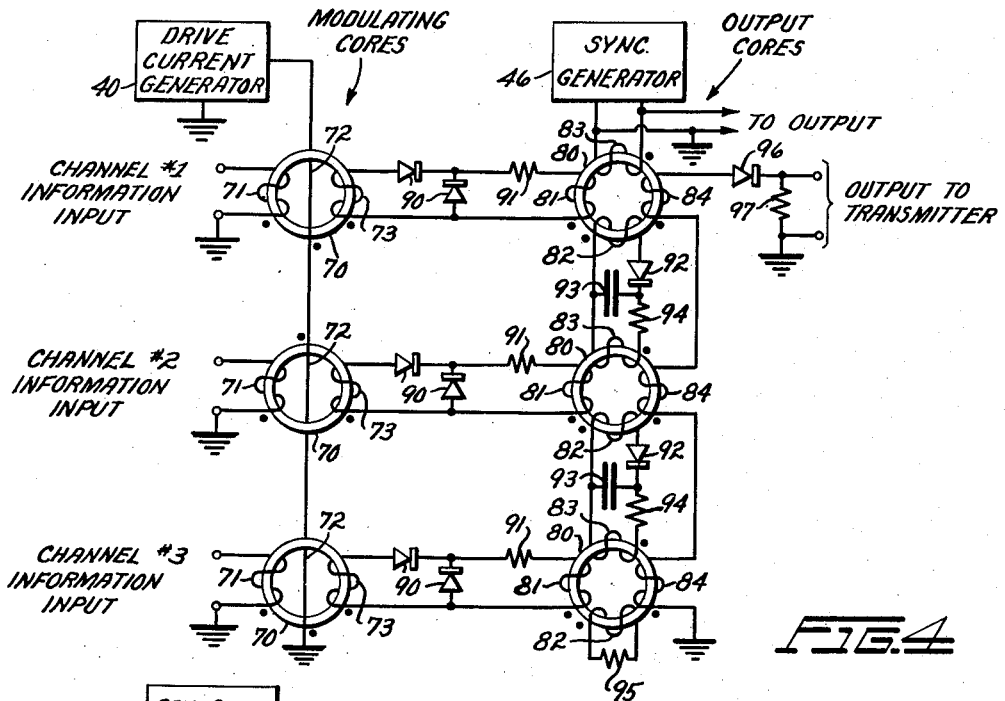
Figures 4 and 5 show additional embodiments of pulse-time modulation multiplex transmitters in accordance with the invention.

Another embodiment of the invention is shown in Figure 4. This embodiment is quite similar to the one shown in Figure 1, the only difference being the method by which the "1" state is advanced through the channel selection counter (magnetic shift register). Each channel of information is applied to a separate saturable magnetic modulating core 70 by means of information input windings 71 coupled to the modulating cores 70. The drive current generator 40 is coupled to each of the modulating cores 70 by a drive winding 72. A plurality of saturable magnetic output cores 80 are arranged essentially as a single-line channel selection counter. Each of these output cores 80 is separately coupled to one of the modulating cores 70. This connection is made by a circuit including two diodes 90 and a resistor 91 connected between a coupling winding 73 on the modulating core 70 and a coupling winding 81 on the output core 80. The output cores 80 of the channel selection counter are connected together by a shift circuit including a diode 92, a capacitor or storage device 93, and a resistor 94. This shift circuit is connected between an output advance winding 82 on one output core 80 and an input advance winding 83 on the next output core 80. As will be explained, this shift circuit performs the same function as the storing cores 14 shown in Figure 1. An output winding 84 is coupled to each of the output cores 80, and these output windings 84 are serially connected with each other and to an output circuit having a diode 96 and a resistor 97.

As in the case of Figure 1, it is preferable to connect the sync generator 46 to the input advance winding 83 coupled to the first output core 80, and to terminate the output advance winding 82 on the last output core 80 with a resistor 95, or to eliminate this last output advance winding 82 altogether. As was explained, this prevents the need for additional circuits to assure that one and only one "1" state is present in the channel selection counter at one time.

In operation, the sync generator 46 sets up the "1" state in the first output core 80. The other output cores 80 are in the "0" state. When the drive current, combined with the information input applied to channel 1, is applied to the first modulating core 70, a time-modulated output pulse is produced in the output winding 84 of the first output core 80 in the same manner as explained for Figure 1. A pulse is also produced in the output advance winding 82 coupled to the first output core 80. The first output core 80 then becomes saturated in the "0" state again. The output advance winding 82 and the diode 92 are so connected that current flows through the diode 92 to charge the capacitor 93. The capacitor 93 then discharges through the resistor 94 and the input advance winding 83 coupled to the next output core 80 before the occurrence of the next reversal of the drive current signal. The diode 92 prevents the capacitor 93 from discharging back toward the output advance winding 82 coupled to the first output core 80. The discharge current from the capacitor 83 through the input advance winding 83 sets up the "1" state in the next output core 80. The other windings 81, 82, 84 coupled to the output core 80 and the diodes 90, 92 are arranged so that this pulse does not affect the circuitry associated with these windings. When in the "1" state, the second output core 80 is then ready to produce an output signal in a manner similar to the one just described for the first output core 80.

The "1" state is sequentially transferred down through the output cores 80 of the channel selection counter one by one. After the last output core 80 has produced an output signal, the sync signal may be applied again to the first output core 80 to repeat the cycle previously described. As indicated in Figure 4, this sync signal may also be applied directly to the output to serve as a reference for receiving equipment which utilizes the multiplex signal.

Figure 5:
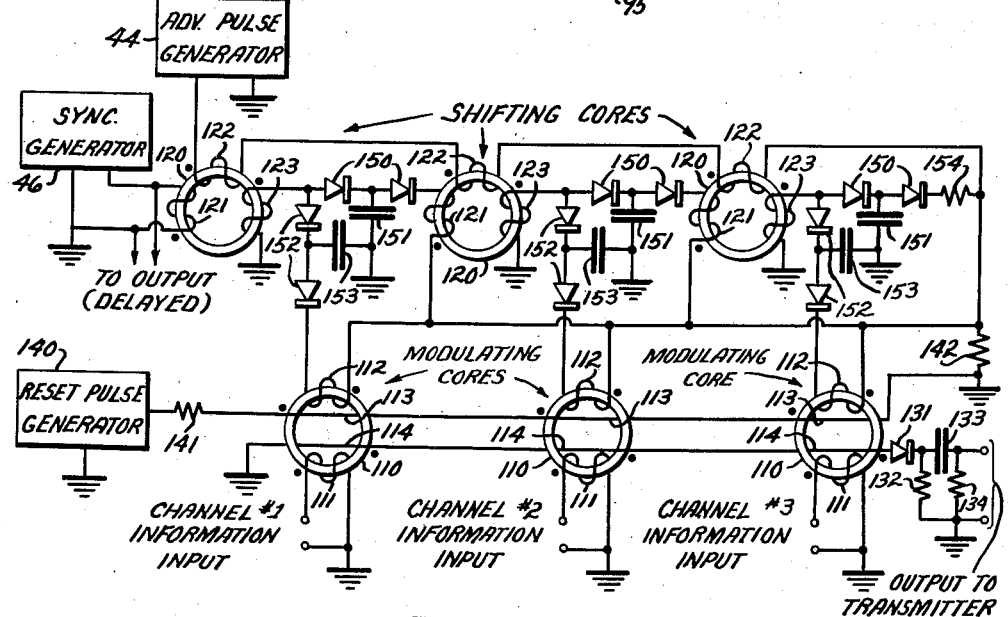

A third embodiment of the invention is shown in Figure 5. The primary difference between this circuit and those previously described is that in this circuit, gating takes place before modulating, rather than modulating before gating as in the previous circuits. Because of this fact, only one of the modulating cores makes a transition during each modulating period. This eliminates the possibility of cross-modulation through common windings on the modulating cores. A square wave, rather than a sloping wave, is applied to the modulating cores. Separate channels of information are individually applied to saturable magnetic modulating cores 110 by means of information input windings 111 coupled to the modulating cores 110. Output signals are derived from the modulating cores 110 by output windings 114 coupled to the modulating cores 110. These output windings 114 are serially connected with each other, and connected to an output circuit which includes a diode 131 and a resistor 132. A differentiating circuit having a capacitor 133 and a resistor 134 is connected to the output circuit to provide the desired sharp output pulses. A reset winding 113 is coupled to each of the modulating cores 110, and these reset windings 113 are serially connected with each other and connected to a reset pulse generator 140 through a resistor 141. The reset pulse generator 140 may be a conventional voltage generator for producing rectangular pulses having a predetermined period or duration and repetition rate. If a current generator is used, the resistor 141 is not essential.

The modulating cores 110 are individually and sequentially set, or enabled, by a single-line channel selection counter having a configuration that is different from the channel selection counters utilized in the systems shown in Figures 1 and 4. Other types of counters, including those shown in the previous figure may be used. The magnetic shift register includes a plurality of saturable magnetic shifting cores 120. A sync generator 46 is connected to the first shifting core 120 through an input advance winding 121 coupled to the first shifting core 120. The shifting cores 120 are coupled to each other through a circuit having two diodes 150 and a capacitor 151. This circuit is connected between the output advance winding 123 coupled to one shifting core 120 and between the input advance winding 121 coupled to the next shifting core 120. A circuit having two diodes 152 and a capacitor 153 is connected between each of the output advance windings 123 coupled to the shifting cores 120 and between a setting or enabling winding 112 coupled to each of the modulating cores 110. An advance pulse winding 122 is coupled to each of the shifting cores 120, and these windings 122 are connected in series with each other and to an advance pulse generator 44. A terminating resistor 142 is connected in series with the advance pulse windings 122 so that during the advance pulse, the advance pulse current will provide a back-biasing voltage on the diodes 150, 152 connected between the output advance windings 123 and between the input advance windings 121 and the setting, or enabling, windings 112.

The operation of the system shown in Figure 5 is somewhat similar to the operation of the systems shown in Figures 1 and 4. The sync generator 46 applies the sync signals to the first shifting core 120 to set up the "1" state in this first shifting core 120. The other shifting cores 120 are in the "0" state. When the advance pulse generator 44 applies an advance pulse to the shifting cores 120, the shifting cores 120 tend to become saturated in the "0" state. No pulse is produced by the shifting cores 120 which are already in the "0" state, but a pulse is produced at the output advance winding 123 coupled to the first shifting core 120. This pulse charges the capacitors 151 and 153.

The back-biasing, provided by the resistor 142 during the advance pulse, in conjunction with the diodes 150, 152, prevents the discharge of the capacitors 151, 153 until the advance pulse ends. When the capacitor 153 connected in the circuit between the shifting cores 120 and the modulating cores 110 discharges, a set pulse is produced. This set pulse is applied to the setting or enabling winding 112 coupled to the first modulating core 110 so that this first modulating core 110 is set, or enabled. The reset pulse generator 140 then applies a reset pulse to the modulating cores 110, and an output signal is produced during the reset pulse at a time determined by the magnitude and polarity of the information applied to the first modulating core 110. This reset pulse is followed by another advance pulse which is applied to the second shifting core 120, and which causes the second modulating core 110 to become set or enabled. The next reset pulse then produces an output signal during the reset pulse at a time determined by the magnitude and polarity of the information applied to the second modulating core 110. This cycle is repeated until all of the modulating cores 110 have produced an output signal.

As shown in Figure 5, it is preferable to terminate the output advance winding 123 coupled to the last shifting core 120 with the resistor 154 so that the waveshape on the capacitors 153 of each of the channels will be similar to that of the other channels. However, this output advance winding 123 can be connected through the diodes 150 and the capacitor 151 to the input advance winding 121 coupled to the first shifting core 120, and the sync generator 46 removed from the system if additional circuits are included to provide for one and only one "1" state in the register at one time.

Wave forms explaining the operation of the system in Figure 5 are shown in Figure 6. The advance pulses produced by the advance pulse generator are shown in Figure 6(a), and the sync pulses produced by the sync generator 46 are shown in Figure 6(g). The voltages appearing across the capacitor 153 are shown in Figure 6(b), and the set or enabling pulses which are applied to the setting or enabling windings 112 are shown in Figure 6(c). As will be noticed in Figure 6(d), the reset pulses are present except during the time that the capacitors 153 set or enable the modulating cores 110. Removal of the resetting current during the set pulses reduces the amount of current required to set the modulating cores 110. Since the capacitors 153 introduce a slight time delay in setting or enabling the modulating cores 110, the time allotted for the period of the individual channel outputs, shown in Figure 6(g), occurs at a slightly later time than the period of the corresponding advance pulse. If, as shown in Figure 5, the sync pulses are also applied directly to the output circuit, they should be delayed slightly so that they do not occur at the time one of the output pulses appears. Information signals showing the maximum range of variation in both directions are shown in Figure 6(e), and the core voltages appearing at the output diode 131 are shown in Figure 6(f). It will be seen in Figure 6(f) that the core voltage applied to the diode 131 ends at a time determined by the magnitude and direction of the information signals. This is explained by the fact that once the modulating cores 110 have reached saturation, they present a short circuit and can sustain no further voltage. The time required for the modulating core 110 to reach saturation depends upon the magnitude and direction of the information signals being applied to the modulating core 110.

The invention claimed is:

1. A pulse-time modulation multiplex system for producing time-modulated pulses from a plurality of information channels, comprising a plurality of magnetic modulating cores having substantially rectangular hysteresis loop characteristic, a separate input winding coupled to each of said cores for applying a different channel of information individually to each one of said cores, a channel selection counter including a plurality of intercoupled magnetic cores coupled to said modulating cores for individually and sequentially enabling said modulating cores, a generator for producing reset pulses having a predetermined duration and repetition rate, means coupling said generator to said modulating cores for causing each separate modulating core, after being previously enabled, to produce an output signal at a time during the duration of said pulses determined in part by the magnitude of the information applied to said enabled modulating core, and a common output circuit coupled to said modulating cores for deriving said output signals.

2. A pulse-time modulation multiplex system for producing time-modulated pulses from a plurality of information channels, comprising a plurality of magnetic modulating cores having substantially rectangular hysteresis loop characteristic, a separate input winding coupled to each of said cores for applying information individually to each one of said cores, a channel selection counter including a plurality of intercoupled magnetic cores coupled to said modulating cores for individually and sequentially enabling said modulating cores, means coupled to said counter to enable said modulating cores individually and sequentially, a generator for producing reset pulses having a predetermined duration and repetition rate, means coupling said generator to said modulating cores for causing each separate modulating core, after being previously enabled, to produce an output signal at a time during said pulse duration determined in part by the magnitude of the information applied to said enabled core, and a common output circuit coupled to said modulating cores for deriving said output signals.

3. A pulse-time modulation multiplex transmitter comprising a plurality of magnetic modulating cores having substantially rectangular hysteresis loop characteristic, input means coupled to said cores for applying signal information to each of said cores, a plurality of magnetic shifting cores having substantially rectangular hysteresis loop characteristic arranged and operated as a channel selection counter, means coupling said shifting cores individually to said modulating cores, means for operating said counter to condition first one and then another of said modulating cores to produce an output pulse upon a reset pulse being applied thereto, means to apply reset pulses to said modulating cores to cause each modulating core after being conditioned by said counter to produce an output pulse time modulated according to the information supplied thereto by said input means, and an output circuit coupled to said modulating cores for deriving said output pulses.

4. A pulse-time modulation multiplex system, comprising a plurality of magnetic modulating cores having substantially rectangular hysteresis loop characteristic, input means coupled to said cores for applying separate information to each of said cores, a channel selection counter having a plurality of magnetic shifting cores having substantially rectangular hysteresis loop characteristic, means including a capacitor coupling said shifting cores together to form an arrangement having alternate shifting cores and capacitors, means including a capacitor coupled between each of said shifting cores and a separate modulating core, means coupled to said shifting cores for applying advance pulses thereto for individually and sequentially enabling said modulating cores to produce output signals, means coupled to said modulating cores for applying reset pulses thereto to produce output signals at a time, during said reset pulses, determined in part by the information applied to the enabled modulating core, and means coupled to said modulating cores for producing output pulses in response to said output signals.

References Cited in the file of this patent

UNITED STATES PATENTS

| | | |
|---|---|---|
| 2,418,116 | Grieg | Apr. 1, 1947 |
| 2,424,977 | Greig | Aug. 5, 1947 |
| 2,652,501 | Wilson | Sept. 15, 1953 |
| 2,659,866 | Landon | Nov. 17, 1953 |
| 2,678,965 | Ziffer et al. | May 18, 1954 |
| 2,719,961 | Karnaugh | Oct. 4, 1955 |
| 2,720,597 | Stuart-Williams et al. | Oct. 11, 1955 |
| 2,758,221 | Williams | Aug. 7, 1956 |
| 2,782,324 | Lee | Feb. 19, 1957 |
| 2,794,130 | Newhouse | May 28, 1957 |
| 2,816,169 | Pawley | Dec. 10, 1957 |

OTHER REFERENCES

"An Analysis of Magnetic Shift Register Operation" by Sands, I.R.E. Proceedings, August 1953, pages 993–999.